United States Patent
Rhoades et al.

(10) Patent No.: US 9,916,061 B2
(45) Date of Patent: Mar. 13, 2018

(54) DRAWING OBJECT INFERRING SYSTEM AND METHOD

(71) Applicant: SIEMENS PRODUCT LIFECYCLE MANAGEMENT SOFTWARE INC., Plano, TX (US)

(72) Inventors: Daren Rhoades, Laguna Hills, CA (US); Thomas James Buchanan, Vizcaya (ES); Steven Robert Jankovich, Buena Park, CA (US)

(73) Assignee: SIEMENS PRODUCT LIFECYCLE MANAGEMENT SOFTWARE INC., Plano, TX (US)

( * ) Notice: Subject to any disclaimer, the term of this patent is extended or adjusted under 35 U.S.C. 154(b) by 369 days.

(21) Appl. No.: 14/707,759

(22) Filed: May 8, 2015

(65) Prior Publication Data

US 2016/0328117 A1    Nov. 10, 2016

(51) Int. Cl.
| | | |
|---|---|---|
| G06F 3/048 | (2013.01) | |
| G06F 3/0481 | (2013.01) | |
| G06F 3/0484 | (2013.01) | |
| G06F 3/0488 | (2013.01) | |
| G06K 9/00 | (2006.01) | |
| G06K 9/62 | (2006.01) | |
| G06T 11/60 | (2006.01) | |

(52) U.S. Cl.
CPC ........ *G06F 3/04817* (2013.01); *G06F 3/0488* (2013.01); *G06F 3/04845* (2013.01); *G06F 3/04883* (2013.01); *G06K 9/00402* (2013.01); *G06K 9/6201* (2013.01); *G06T 11/60* (2013.01)

(58) Field of Classification Search
CPC ....... G06F 3/017; G06K 9/3241; G06T 11/60; G06T 11/206; G06T 19/20; G06T 2200/24; G06T 2219/2016
See application file for complete search history.

(56) References Cited

U.S. PATENT DOCUMENTS

| | | | |
|---|---|---|---|
| 6,421,461 B1 * | 7/2002 | Arai | G06K 9/6255 382/187 |
| 7,515,752 B2 | 4/2009 | Tremblay et al. | |
| 2006/0008151 A1 * | 1/2006 | Lin | G06K 9/6292 382/190 |

(Continued)

OTHER PUBLICATIONS

Hse H H et al: "Recognition and beautification of multi-stroke symbols in digital ink", Computers and Graphics, Elsevier, GB, vol. 29, No. 4, Aug. 1, 2005, pp. 533-546 (14 pages).

(Continued)

*Primary Examiner* — Claudia Dragoescu

(57) ABSTRACT

A system having a processor is provided that visually manipulates objects on a touch screen responsive to inputs through the touch screen. Based at least in part on data representative of type and size for a plurality of prior objects displayed through a display device, the processor may determine that at least one input through the input device corresponds to a further object having a determined type corresponding to at least one of the prior objects and having a size within predetermined tolerances of corresponding to the at least one of the prior objects. Also the processor may cause responsive thereto the display device to display a replacement object in place of the further object having a size and shape corresponding to the at least one prior object.

20 Claims, 7 Drawing Sheets

(56) References Cited

U.S. PATENT DOCUMENTS

| | | | |
|---|---|---|---|
| 2007/0136682 A1* | 6/2007 | Stienhans | G06F 9/4443 |
| | | | 715/789 |
| 2010/0127991 A1* | 5/2010 | Yee | G06F 3/04883 |
| | | | 345/173 |
| 2013/0055125 A1* | 2/2013 | Jackson | G06F 3/04845 |
| | | | 715/769 |
| 2014/0088926 A1 | 3/2014 | Rhoades et al. | |
| 2016/0155248 A1 | 6/2016 | Ng | |
| 2016/0231924 A1* | 8/2016 | Le | G06T 11/00 |

OTHER PUBLICATIONS

S. Murugappan et al: "Towards beautification of freehand sketches using suggestions", Proceedings of the 6th Eurographics Symposium on Sketch-Based Interfaces and Modeling, SBIM ' 09, Aug. 2, 2009, p. 69 New York, US (8 pages).

Ferran Naya et al: "Parametric Freehand Sketches", Apr. 28, 2004, Computational Science and Its Applications—ICCSA 2004; [Lecture Notes in Computer Science; LNCS], Springer-Verlag, Berlin/Heidelberg, pp. 613-621 (10 pages).

Salman Cheema et al: "Quickdraw", Proceedings of the 2012 ACM Annual Conference on Human Factors in Computing Systems, CHI '12, Jan. 1, 2012, p. 1037 New York, US (10 pages).

PCT International Search Report and Written Opinion dated Jul. 28, 2016 corresponding to PCT Application No. PCT/US2016/031102 filed May 5, 2016 (13 pages).

* cited by examiner

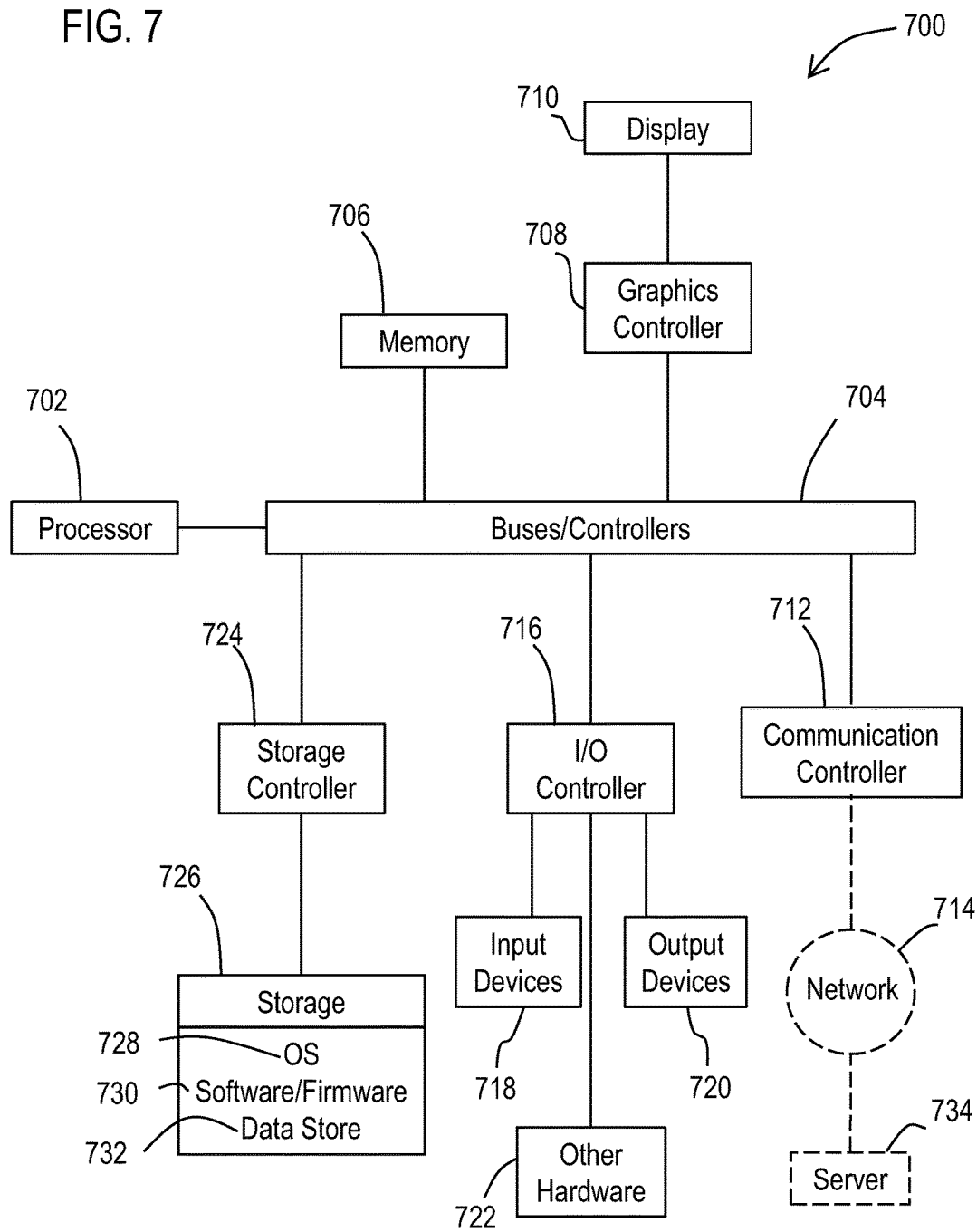

DRAWING OBJECT INFERRING SYSTEM AND METHOD

TECHNICAL FIELD

The present disclosure is directed, in general, to computer-aided design, visualization, and manufacturing systems, product data management (PDM) systems, product lifecycle management ("PLM") systems, and similar systems, that are used to create and manage data for products and other items (collectively referred to herein as product systems).

BACKGROUND

Computer-aided design (CAD) systems and other types of drawing systems may include a graphical user interface (GUI) through which drawings of products may be created. Such graphical user interfaces may benefit from improvements.

SUMMARY

Variously disclosed embodiments include systems and methods that may be used to draw objects in a CAD system or other type of drawing system. In one example, a system may comprise at least one processor. The at least one processor may be configured to determine based at least in part on data representative of type and size for a plurality of prior objects displayed through a display device on a workspace, that at least one input through an input device corresponds to a further object having a determined type corresponding to at least one of the prior objects and having a size within predetermined tolerances of corresponding to the at least one of the prior objects. The at least one processor may also be configured to cause responsive thereto the display device to display a replacement object on the workspace in place of the further object having a size and shape corresponding to the at least one prior object.

In another example, a method may include various acts carried out through operation of at least one processor. Such a method may include determining based at least in part on data representative of type and size for a plurality of prior objects displayed through a display device on a workspace, that at least one input through the input device corresponds to a further object having a determined type corresponding to at least one of the prior objects and having a size within predetermined tolerances of corresponding to the at least one of the prior objects. Also responsive to this determination, this example method may include causing the display device to display a replacement object on the workspace in place of the further object having a size and shape corresponding to the at least one prior object.

A further example may include non-transitory computer readable medium encoded with executable instructions (such as a software component on a storage device) that when executed, causes at least one processor to carry out this describe method.

The foregoing has outlined rather broadly the technical features of the present disclosure so that those skilled in the art may better understand the detailed description that follows. Additional features and advantages of the disclosure will be described hereinafter that form the subject of the claims. Those skilled in the art will appreciate that they may readily use the conception and the specific embodiments disclosed as a basis for modifying or designing other structures for carrying out the same purposes of the present disclosure. Those skilled in the art will also realize that such equivalent constructions do not depart from the spirit and scope of the disclosure in its broadest form.

Before undertaking the Detailed Description below, it may be advantageous to set forth definitions of certain words or phrases that may be used throughout this patent document. For example, the terms "include" and "comprise," as well as derivatives thereof, mean inclusion without limitation. The singular forms "a", "an" and "the" are intended to include the plural forms as well, unless the context clearly indicates otherwise. Further, the term "and/or" as used herein refers to and encompasses any and all possible combinations of one or more of the associated listed items. The term "or" is inclusive, meaning and/or, unless the context clearly indicates otherwise. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like.

Also, although the terms "first", "second", "third" and so forth may be used herein to describe various elements, functions, or acts, these elements, functions, or acts should not be limited by these terms. Rather these numeral adjectives are used to distinguish different elements, functions or acts from each other. For example, a first element, function, or act could be termed a second element, function, or act, and, similarly, a second element, function, or act could be termed a first element, function, or act, without departing from the scope of the present disclosure.

In addition, phrases such as "processor is configured to" carry out one or more functions or processes, may mean the processor is operatively configured to or operably configured to carry out the functions or processes via software, firmware, and/or wired circuits. For example a processor that is configured to carry out a function/process may correspond to a processor that is actively executing the software/firmware which is programmed to cause the processor to carry out the function/process and/or may correspond to a processor that has the software/firmware in a memory or storage device that is available to be executed by the processor to carry out the function/process. It should also be noted that a processor that is "configured to" carry out one or more functions or processes, may correspond to a processor circuit particularly fabricated or "wired" to carry out the functions or processes (e.g., an ASIC or FPGA design).

The term "adjacent to" may mean: that an element is relatively near to but not in contact with a further element; or that the element is in contact with the further portion, unless the context clearly indicates otherwise.

Definitions for certain words and phrases are provided throughout this patent document, and those of ordinary skill in the art will understand that such definitions apply in many, if not most, instances to prior as well as future uses of such defined words and phrases. While some terms may include a wide variety of embodiments, the appended claims may expressly limit these terms to specific embodiments.

BRIEF DESCRIPTION OF THE DRAWINGS

FIG. 7 illustrates a block diagram of a data processing system in which an embodiment can be implemented.

DETAILED DESCRIPTION

Figure 1:
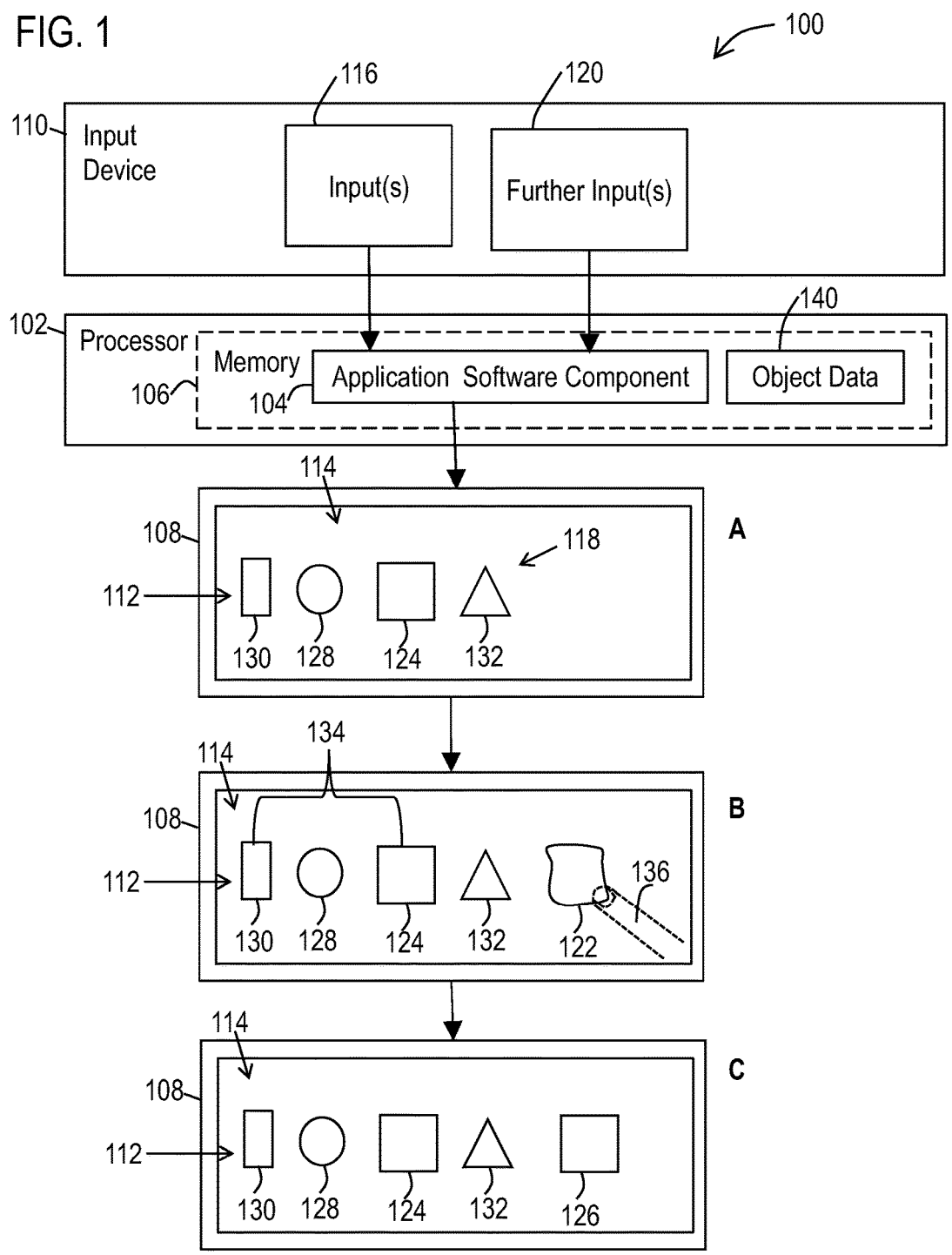
FIG. 1 illustrates a functional block diagram of an example system that facilitates drawing objects.

Various technologies that pertain to drawing systems will now be described with reference to the drawings, where like reference numerals represent like elements throughout. The drawings discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged apparatus. It is to be understood that functionality that is described as being carried out by certain system components may be performed by multiple components. Similarly, for instance, a component may be configured to perform functionality that is described as being carried out by multiple components. The numerous innovative teachings of the present application will be described with reference to exemplary non-limiting embodiments.

Many forms of drawing systems (such as CAD systems) are operative to manipulate various types of visual objects. Such visual objects may include geometric primitives such as straight line segments, arcs, curves, and splines. Such visual objects may also include 2-D and 3-D shapes such as circles, squares, rectangles, spheres, cones, cylinders, cubes, and cuboids. Such visual objects may also include combinations of simpler visual objects to form complex 2-D or 3-D structures. Thus in general, a drawing object may correspond to any type of graphical object that can be displayed through a display device (such as a display screen) that is capable of being visually manipulated via inputs through an input device with respect to shape, size, orientation, and/or position.

With reference to FIG. 1, an example system 100 that facilitates drawing and manipulating objects is illustrated. The system 100 may include at least one processor 102 that is configured to execute one or more application software components 104 from a memory 106 in order to carry out the various features described herein. The application software component 104 may include a drawing software application or a portion thereof such as a CAD software application. Such a CAD software application may be operative to produce a CAD drawing based at least in part on inputs provided by a user.

An example of CAD/CAM/CAE software that may be adapted to include at least some of the functionality described herein includes the NX suite of applications that is available from Siemens Product Lifecycle Management Software Inc. (Plano, Tex.). However, it should also be understood that such a drawing software application may correspond to other types of drawing software, including vector based illustration software, presentation software, diagramming software, word processing applications, games, visual programming tools, and/or any other type of software that involves drawing and manipulation of objects.

The described system may include at least one display device 108 (such as a display screen) and at least one input device 110. For example, the processor 102 may be integrated into a housing that includes a touch screen that serves as both an input and display device. Examples of such systems may include mobile phones, tablets, and notebook computers. However, it should be appreciated that example embodiments may use other types of input and display devices. For example, systems may include display devices with display screens that do not include touch screens, such as an LCD monitor or a projector. Further, systems may use other types of input devices to provide inputs for manipulating objects such as a mouse, pointer, touch pad, drawing tablet, track ball, joystick, keypad, keyboard, camera, motion sensing device, or any other type of input device capable of providing the inputs described herein.

Further it should be noted that the processor described herein may be located in a server that is remote from the display and input devices described herein. In such an example, the described display device and input device may be included in a client device that communicates with the server (and/or a virtual machine executing on the server) through a wired or wireless network (which may include the Internet). In some embodiments, such a client device for example may execute a remote desktop application or may correspond to a portal device that carries out a remote desktop protocol with the server in order to send inputs from an input device to the server and receive visual information from the server to display through a display device. Examples of such remote desktop protocols include Teradici's PCoIP, Microsoft's RDP, and the RFB protocol. In such examples, the processor described herein may correspond to a virtual processor of a virtual machine executing in a processor of the server.

FIG. 1 schematically illustrates a plurality of different views (A-C) of the display device 108 that are caused to be displayed by the processor 102 in response to various inputs received through the input device 110. For example in view A of the display device 108, the processor 102 may be configured (such as via the described application software component 104) to cause the display device 108 to display visual objects 112 on a workspace 114 responsive to drawing inputs 116 received through the input device 110. Such a workspace 114 may correspond to a two-dimensional background surface on which objects are drawn, displayed, and manipulated in a graphical user interface of the application software component 104. However, it should also be appreciated that for 3-D drawings, the workspace may correspond to a two dimensional view of a three dimensional space in which objects are visually drawn, displayed, and manipulated using the graphical user interface of the application software component 104. Also in other examples, 3-D displays may be used to render 3-D drawings in a 3-D workspace.

In example embodiments, the visual objects 112 displayed through the display device 108 may include prior objects 118 that may have been drawn responsive to the drawing inputs 116 through the input device 110. Each of the prior objects 118 may have a type and size. Object data 140 representative of the type and size of these prior objects may be determined by the processor 102 and stored in the memory 106 (and/or in some other data store such as a drawing file stored on a storage device).

Also, it should be appreciated that the prior objects on the workspace may have been drawn at some previous time via a different processor, display device, and input device and saved to a file that is loaded via the present processor 102 and displayed on the display 108. Also, it should be appreciated that the prior objects may be placed on the workspace via importing, pasting, loading, and/or any other type of operation that causes the prior objects to be displayed on the workspace. Further the prior objects may correspond to objects loaded on the workspace that have been further manipulated via inputs through the input device 110.

Examples of object type data that may be determined to correspond to an object may include geometric primitive types such as: straight lines and curved lines or any other primitive types that can be determined from a visual representation of a line. Also, examples of object type data that may be determined for an object may include geometric shape types such as: rectangles, triangles, other polygons, circles, ellipses, and/or any other shape that can be consistently recognized from the configuration of the one or more lines that comprise an object. Also examples of size data that may be determined to corresponds to an object may include the width and height of the object (such as for a rectangle), the diameter(s) of the object (such as for a circle, ellipse), the lengths of each of the sides and/or angles between sides of the article (such as a triangle or other polygon), and/or any other measurement data that can be used to quantify the size dimensions of the object.

As shown in view B of the display device, the processor may be configured to receive at least one input 120 through the input device 110, and in responsive thereto cause the display device 108 to output a further object 122. When a user stops providing the inputs 120 for drawing the further object 122, the processor may be configured to determine the type and size of the further object. For example, if the input device corresponds to a touch screen, when the user lifts up their finger 136 (or a stylus) from the surface of the touch screen, an event may be received by the application software component that triggers the software component to begin determining the type and size of the further object 122. Similarly for an input device such as a mouse, the processor may be configured to determine the type and size of the further object upon receipt of a detected event corresponding to a mouse button up event or other input indicating that at least a portion of the further object is complete.

It should be appreciated that the further object may correspond to a newly drawn object recognized from drawn/digital ink inputs on the workspace that did not exist previously. However, it should also be appreciated that the further object may correspond to a pre-existing object that is being currently manipulated in some manner. Thus a manipulated prior object may correspond to the further object described herein.

In addition, it should be appreciated that a further object may be completed in several different drawing events in which a finger, stylus, or mouse is used (via separate touches or mouse clicks) at different times to draw the object. Thus in an example embodiment, the software application component 104 may reevaluate the type and shape of the further object after each separate addition, deletion, and/or modification to the further object.

In an example embodiment, the processor 102 may be configured to determine, based at least in part on the data representative of type and size for a plurality of the prior objects 118, that the at least one input 120 corresponds to the further object 122 having a determined type corresponding to at least one of the prior objects and having a size within predetermined tolerances of corresponding to the at least one of the prior objects.

For example as illustrated in FIG. 1, the processor may be configured to determine that the further object 122 has a general shape that corresponds to a rectangle type of object. The processor may also determine from data representative of the prior objects 112, that at least one 124 of the prior objects 118 also corresponds to a rectangle type of object. In addition, the processor may be configured to determine the size dimensions of the further object 122 and compare these to the size dimension data previously determined for the at least one prior object 124 that has the same corresponding rectangle object type. Further, the processor may be configured to determine that the size dimensions (width and height) of the further object rectangle is within 10% (or other range for tolerances) of having the same size dimensions as the prior object 124.

It should be appreciated that the prior objects may include a plurality of different types of shapes. For example as illustrated in FIG. 1, the prior objects include a circle type 128, two types of rectangle types 124, 130 and a triangle type 132 of drawn objects. The processor may be configured to determine the type of the further object and to select a candidate set 134 of prior objects that have the same type (e.g., rectangle type) as the further object 122 from the larger set of prior objects 112 that includes prior objects of different types. Such a candidate set 134 may include more than one prior object having a common size or having different sizes. Thus the processor may be configured to compare the size of the further object to the respective sizes of the prior objects 124, 130 in the candidate set 134 to determine that the at least one prior object 124 in the candidate set, closely matches the further object.

As shown in view C of the display device 108, the at least one processor may be configured to cause the display device to output on the workspace 114 a replacement object 126 in place of the further object having a size and shape corresponding to the at least one prior object 124, based on this determination (matching object types and object sizes within predetermined tolerances).

In this manner a user may freehand draw a shape on the workspace that is less than being a perfect symmetrical shape (e.g., opposite sides of a rectangle may not have the same length and/or may not be perfectly parallel with each other). The application software component 104 may cause the processor to carry out a shape recognition algorithm that identifies (based on the orientation and location of different lines, vertices and other drawing features) which object type most closely matches the drawn object.

However, rather than simply replacing the further object with a more smoothly drawn version of the same determined type of object, the at least one processor may be configured to replace the further object with a smoothly drawn version having a size that matches the determined at least one prior object. Also, it should be appreciated that if the further object is not within predetermined tolerances of one of the prior objects, then the processor may leave the original further object on the workspace or may replace the further object with a more smoothly drawn replacement object shape having generally the same size as the further object rather than the size of one of the prior object.

In an example embodiment, the user interface of the application software component may include (in addition to the workspace) a configuration menu, window or other graphical user interface control that enables a user to set and modify such size tolerances for use with determining which prior drawn objects are sufficiently similar in size to determine what size to make the replacement object 126. Such tolerances may be specified by a percentage range (e.g., within 10%), via distance (e.g., within 0.19 inches/5 mm), via pixel size (e.g., within 25 pixels), via angular orientation (e.g., within 10 degrees), or any other range of values which can be used to compare the dimensions of drawn objects.

In example embodiments, the replacement object 126 may become one of the prior objects 112. Thus, the processor may be configured to update the object data 140 stored in the memory 106 or other location, to include the type and size data associated with the replacement object 126 for use with comparing to the type and size data associated with any other later drawn (or modified) objects.

In addition, the processor may be configured to include the sequential order in which each object is drawn (or modified) on the workspace 114 in the object data 140. Such sequential order data may correspond: to an incremental order number assigned to each object; a timestamp of when the object was drawn/modified, and/or any other data that can be used to determine the relative order that objects were drawn/modified. Also, the processor may be configured to include position data in the object data 140 that is representative of the position on the workspace 114 that each drawn object is located. Thus, for the replacement object, the processor may modify the object data 140 to include the object type, size, and position, of the replacement object as well as sequential order data representative of the replacement object being the most recent drawn/modified object.

In example embodiments, the processor 102 may be configured to select an amount of prior objects to include in the candidate set 134 that is less than a total number of prior objects having the same type as the further object. Such a maximum number may correspond to a predetermined maximum number of prior objects that is stored in the memory 106 or some other storage location. In an example embodiment, the user interface of the application software component may include a configuration menu, window or other graphical user interface control that enables a user to set and modify such a predetermined maximum number of prior objects to include in the candidate set 134.

Figure 2:
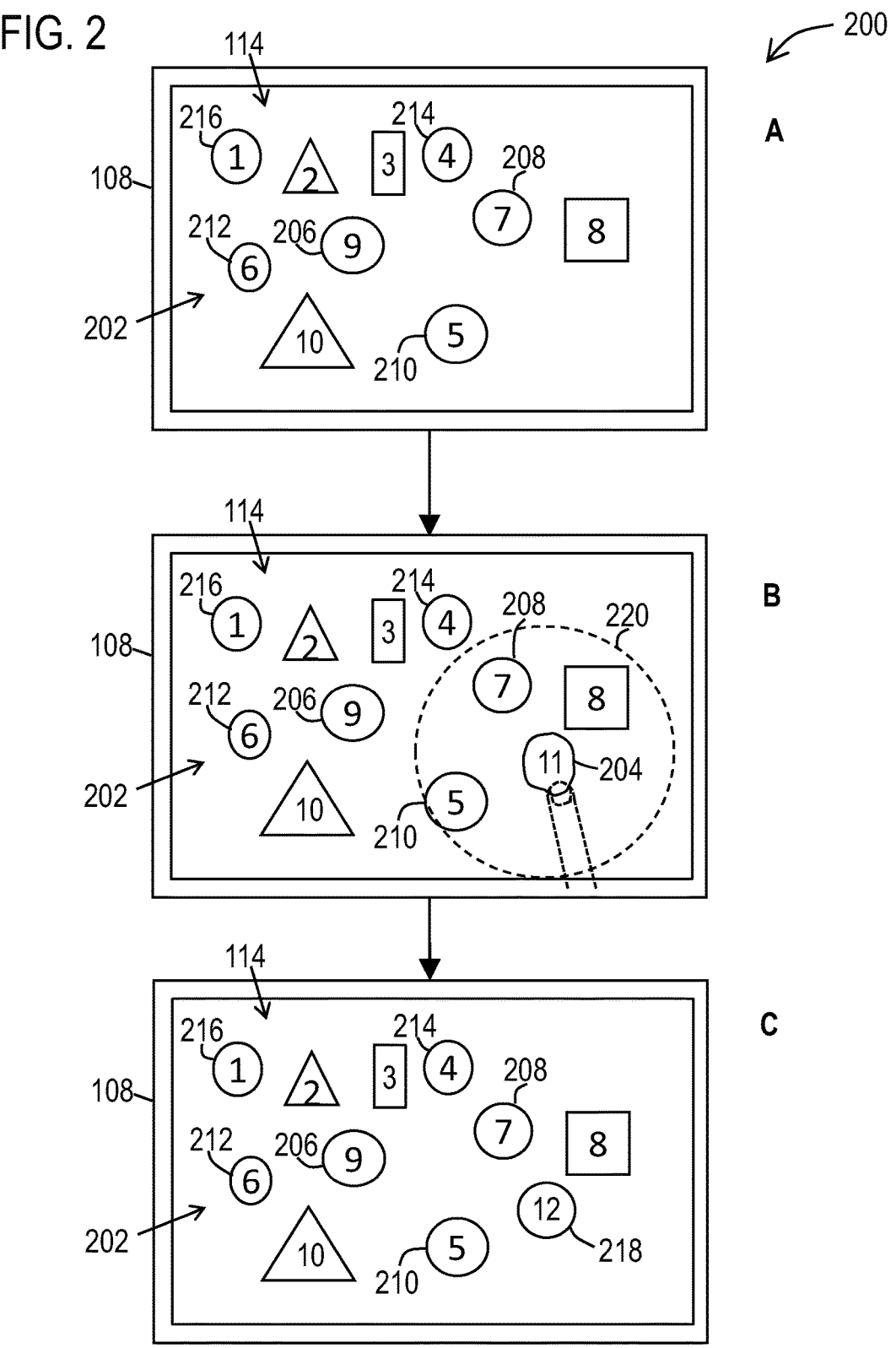
FIGS. 2-5 illustrate sequences of views of a display device in which a further object is drawn and replaced by a replacement object.

For example, FIG. 2, illustrates example views 200 (A-C) of the workspace 114 provided by the display device 108. In view A, the workspace 114 includes ten prior objects 202 of different types (circles, triangles, rectangles). For illustration purposes, each of these objects includes the respective sequential order number in which each object was drawn. In view B, a further object 204 with a circle type has been added to the workspace 114.

In this example, if the predetermined maximum number of prior objects corresponds to a value of five, then the application software component 104 will select those prior objects for the candidate set that correspond to circles and which are the most recent five prior objects of the object type circle. Thus in this example, the candidate set will include the prior objects 206, 208, 210, 212, and 214 but not the prior circle 216.

As discussed previously, the application software component 104 will compare the size (e.g., diameters) of the further object 204 to the sizes (e.g., diameters) of the candidate set of five prior objects. As illustrated in view C of the display device 108 in FIG. 2, if the size of the further object is within a predetermined threshold of corresponding to the size of at least one of the candidate prior objects, then the processor will replace the further object with a replacement object 218 having the same size as the at least one of the prior objects in the candidate set. If the further object is within tolerances of two differently sized prior objects, then the processor may be configured to make the replacement object use the dimensions of the most recent prior object or the prior object with the closest size.

In a further example embodiment, the processor may be configured to select an amount of prior objects to include in the candidate set that is less than a total number of prior objects having the same type as the further object based at least in part on the position of the further object relative to the positions of the prior objects.

For example with respect to FIG. 2, the processor may be configured to determine which prior objects 202 of the same type are within a predetermined distance of the further object 204. Such a predetermined distance may correspond to a radial distance with respect to a central portion of the further object. For example, FIG. 2 illustrates in a broken line circle 220 that shows which prior objects are within a predetermined radial distance (e.g., 4 inches/10.2 cm) of the further object 204. In this example, only objects 208 and 210 correspond to objects of type circle that are (at least partially) within the predetermined distance (i.e., broken line circle 220). Thus only these two prior objects correspond to the candidate set that is compared to the further object 204.

It should also be appreciated that in other examples, the predetermined distance may correspond to a box defined by vertical sides within predetermined horizontal distances of the further object and defined by horizontal sides within predetermined vertical distances of the further object. Further, other example embodiments may use other spatial groupings to determine which predetermined objects are within a predetermined range of the further object.

In an example embodiment, the user interface of the application software component may include a configuration menu, window or other graphical user interface control that enables a user to set and modify such a predetermined distance in which the prior objects are chosen to include in the candidate set.

It should also be appreciated that example embodiments may chose which prior objects to include in the candidate set based on being with a predetermined distance of the further object and/or being within a predetermined number of the most recent prior objects added to the workspace.

In a further example embodiment, the processor 102 may be configured to determine that the further object and at least two of the prior objects in the candidate set are within predetermined tolerances of having the same size and shape and of being equally spaced apart and aligned. Responsive to this determination, the processor may cause the replacement object to be displayed through the display device such that the replacement object and the at least two of the prior objects have the same size and shape and are equally spaced apart and aligned.

Figure 3:
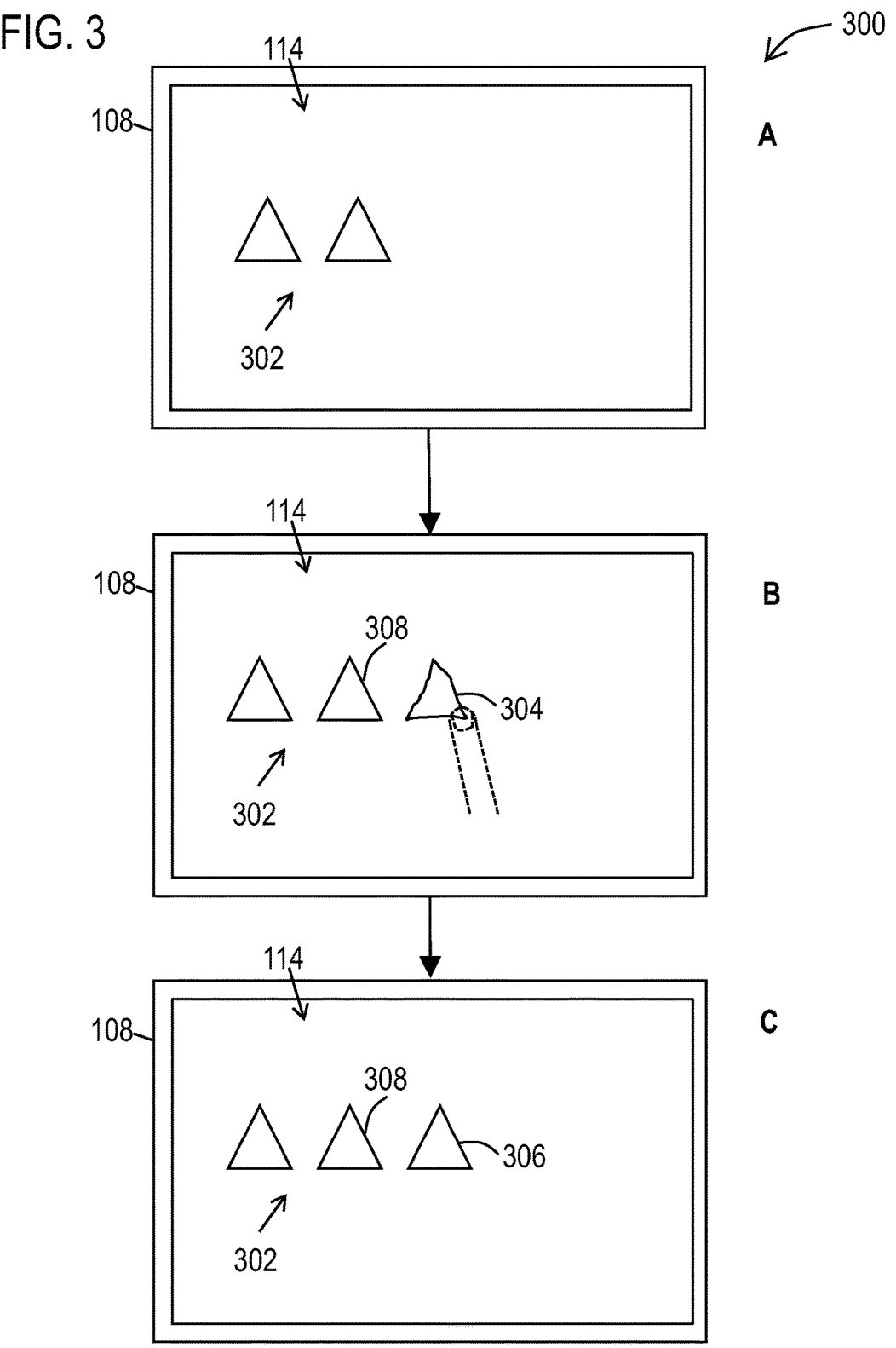

For example, FIG. 3, illustrates example views 300 (A-C) of the workspace 114 provided by the display device 108. In view A, the workspace 114 includes two prior objects 302 of the same type (e.g., triangles) which are spaced apart. Each of these objects has the same size and the objects are aligned horizontally. Thus the object data 140 for these objects may include the same vertical coordinate for the vertical position of these objects.

In view B, a further object 304 with a triangle type has been added to the workspace 114. As discussed previously, the processor may be operative to determine that both of prior objects have the same object type and are within the predetermined tolerances of having a size that corresponds to the size of the further object 304. The processor may be further responsive to the position data determined for the further object 304 and the prior objects 302 to determine that the vertical position of the further object 304 is within a predetermined distance of the vertical positions of the prior objects 302. As illustrated in view C, responsive to this determination, the processor may be configured to replace the further object 304 with a replacement object 306 having the same size and vertical position as the prior objects.

The processor may be further responsive to the position data determined for the further object 304 and the prior objects 302 to determine that the horizontal spacing between the prior objects 302 is within a predetermined distance of the horizontal spacing between the further object 304 and the closest prior object 308. As illustrated in view C, responsive to this determination, the processor may be configured to place the replacement object 306 such that it is spaced apart from prior object 308 with the same distance that the prior objects 302 are spaced apart.

It should also be appreciated that the processor may be configured to determine other alignment and spaced apart relationships with respect to sets of objects, such as alignments of objects that are spaced apart vertically or diagonal, in order to determine a position of the replacement object that has a corresponding alignment and spacing with respect to the prior objects of the same size and type.

In an example embodiment, the user interface of the application software component may include a configuration menu, window or other graphical user interface control that enables a user to set and modify such predetermined tolerances (e.g., within 0.25 inches/0.64 cm or other distances) in which to determined whether the further object has the same vertical position and/or spacing with respect to prior objects of the same type.

In addition, in further example embodiments, the processor may be configured to determine that the further object and several (such as four) of the prior objects in the candidate set are within predetermined tolerances of having the same size and shape (and orientation) and of being aligned and/or spaced in a repeating pattern of differently aligned and/or differently spaced drawn objects. Responsive to this determination, the processor may cause the replacement object to be displayed through the display device such that the replacement object and the several prior objects have the same size and shape (and orientation) and have an alignment and/or spacing with respect to each other that enables the repeating pattern to continue with the addition of the replacement object.

Figure 4:
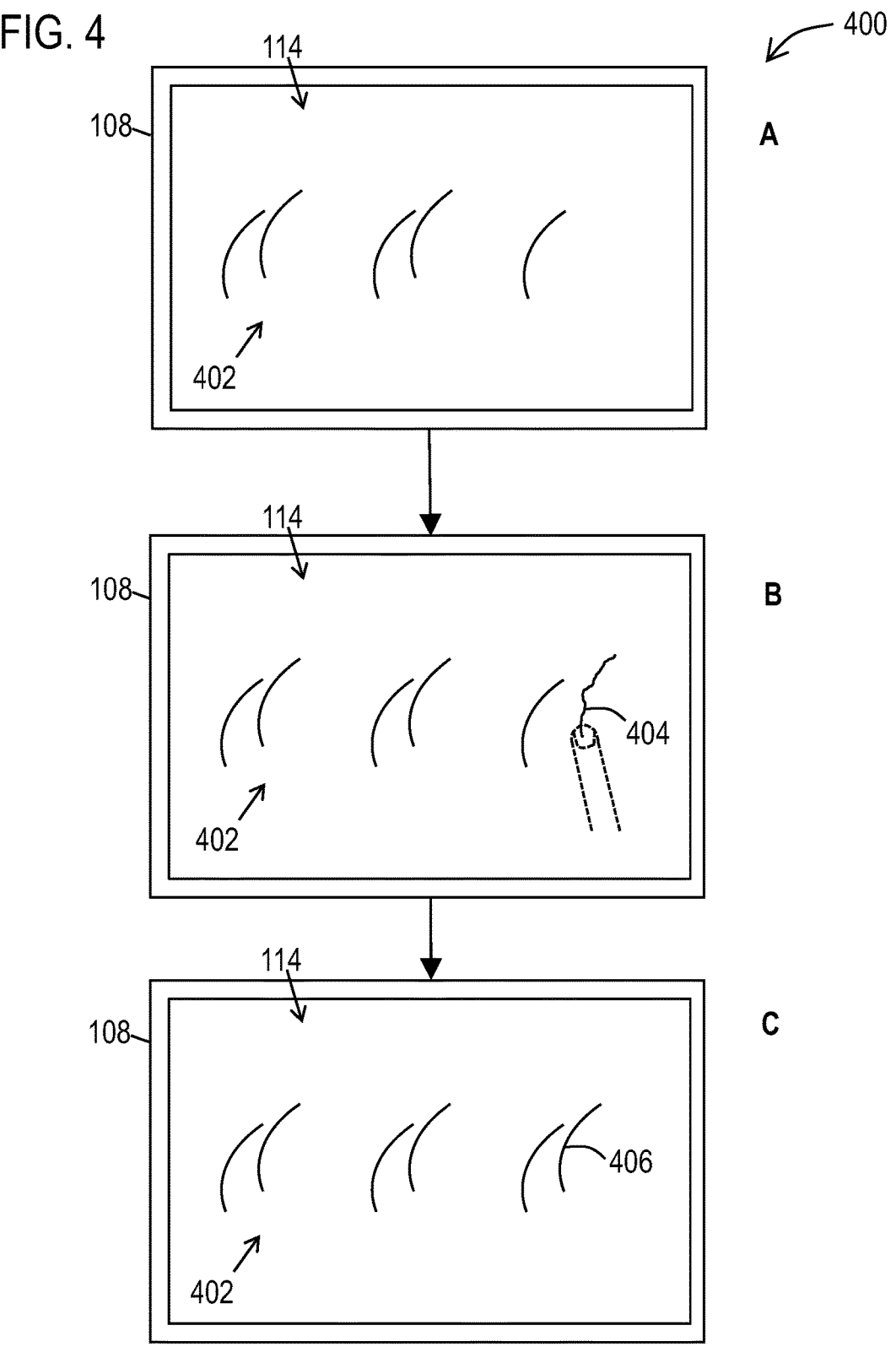

For example, FIG. 4, illustrates example views 400 (A-C) of the workspace 114 provided by the display device 108. In view A, the workspace 114 includes four prior objects 402 of the same type (e.g., curved lines) which are spaced apart. Each of these objects has the same size (and same curved shape and orientation) and alternate in horizontal directions between two spaced apart vertical positions and alternating spacing. Thus the object data 140 for these objects may include the two different alternating vertical coordinates for the vertical position of these objects and the position data may represent that the spacing between these objects alternates between a first closer spacing and a second larger spacing.

Because a curved line type of object (and other types of objects) may have different shapes depending on line curvature, in order to compare a further object to such prior objects, the at least one processor may also determine and store shape data in the object data for prior objects. For a curved line, such shape data may include the amount of curvature of the line. For more complex shapes (such as an irregular polygon) the shape data may include the relative locations of lines, the sizes of the lines that form the shape and/or any other data that quantifies the shape for use with comparing to further objects.

Also, because a curved line type of object (and other types of objects) may be orientated at different rotational angles, the at least one processor may also determine and store orientation data in the object data for prior objects. For a curved line type of object, such orientation data may include the angle between the end points of the curve. However it should be appreciated that different types of objects may include different criteria for determining the orientation of the object.

Thus in addition to comparing the sizes of the objects, the processor may be configured to determine the amount of curvature and the orientation of the curved lines of the prior objects 402 (which data may be stored as port of the object data 140). The processor may also be configured to determining the amount of curvature and the orientation corresponding to the further object 404.

View B of FIG. 4 shows an example of a further object 404 with a curved line type that has been added to the workspace 114. In this example, the processor may be operative to determine that the prior objects 402 have the same object type and are within the predetermined tolerances of having a size, shape and orientation that correspond to the size, shape, and orientation of the further object 404.

Thus, as illustrated in view C of FIG. 4, the processor may be operative to replace the further object 404 with a replacement object 406 that has the same size, shape, and orientation as the prior objects 402.

In addition, the processor may be further responsive to the position data determined for the further object 404 and the prior objects 402 to determine that the horizontal and vertical positions of the further object 404 is within a predetermined distance of being in a position that continues the vertical alternating pattern of the prior objects 402 and well as continuing the alternating spacing pattern between objects. As illustrated in view C, responsive to this determination, the processor may be configured to replace the further object 404 with a replacement object 406 in a position so that the set of prior objects and the replacement object continues to have the determined position pattern associated with the prior objects.

It should also be appreciated that the processor may be configured to determine other spatial patterns with respect to sets of objects (such as patterns that follow a curved line), in order to determine a position for the replacement object. Also, the previously described configuration graphical user interface control may enable a user to set and modify such predetermined tolerances (e.g., within 0.5 inches/1.27 cm or other distances) in which to determined whether the further object is in the general location to be included in a spatial pattern arrangement of prior objects.

The previous examples have illustrated replacing simple shapes with replacement objects corresponding to prior objects on the workspace. It should also be appreciated that the application software component may be operative to replace further objects having more complex shapes with corresponding prior objects as well.

In addition, example embodiments may be configured to work at the primitive level (line, circle, arc, ellipse, spline) to find suitable replacement objects for the individual primitive type objects that are assembled to form a more complex object. In this example, each further primitive type of object added to the workspace may be compared to prior primitive type objects of the same type (e.g., line, circle, arc ellipse, spline) to find a prior primitive type object within tolerances of having the same size, orientation, and/or curvature to serve as a replacement object for the further primitive type object. In other words, as a more complex shape is being built via adding a series of individual lines/curves on the workspace, the application software may be operative to immediately replace each competed line/curve with a replacement line/curve based on prior line/curves within tolerances of the completed line/curve.

To further aid the ability of a user to draw more complex shapes from primitive type objects, the processor may also be configured to snap (i.e., move) further primitive type objects (such as a line) to new position that are co-linear, parallel and/or perpendicular with one or more prior primitive type objects on the workspace within predetermined tolerances of being co-linear, parallel and/or perpendicular with the one or more prior primitive type objects. For example, an ellipse type object may be snapped to make the axes of the further ellipse parallel to a prior ellipse on the workspace when the further ellipse is within a predetermined tolerance of being parallel to the prior ellipse.

Figure 5:
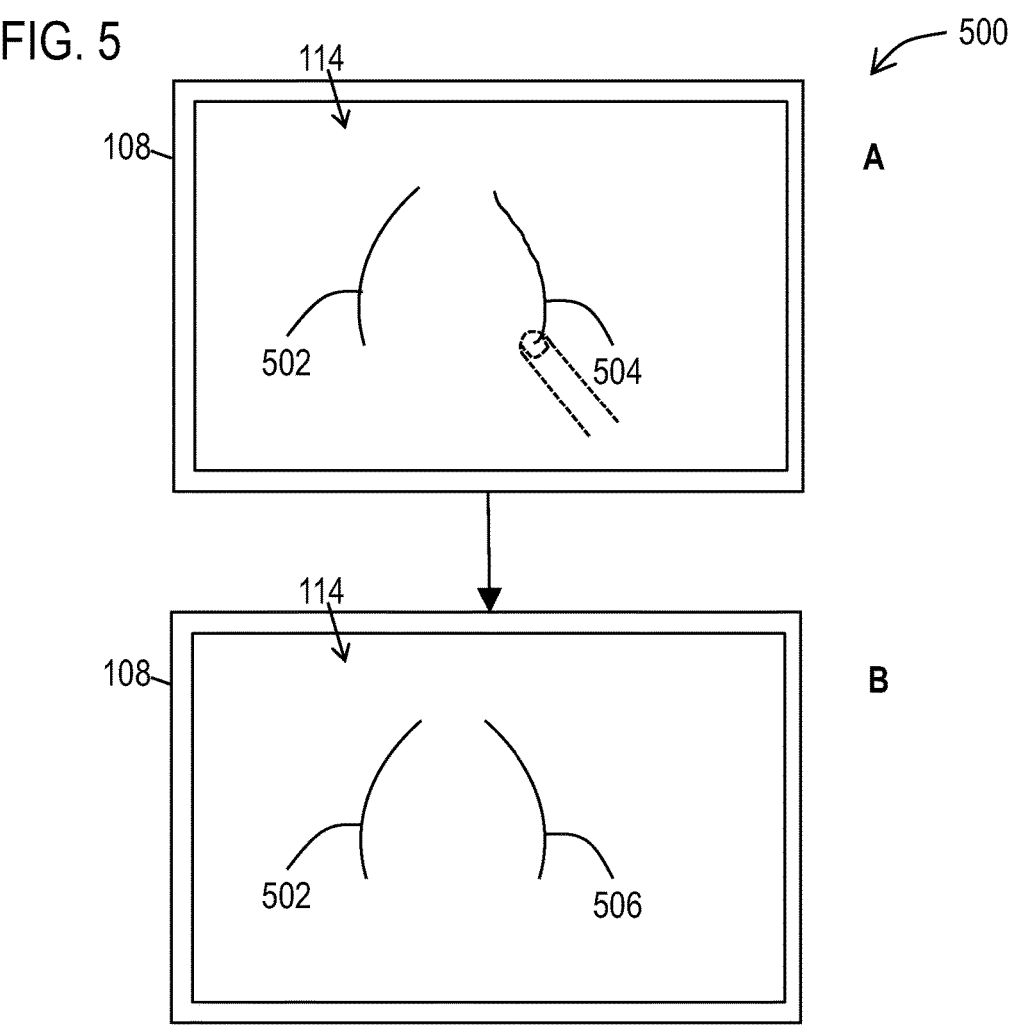

In a further example, the processor may be configured to replace a further object with a mirror configuration of a prior object on the workspace. For example, FIG. 5 illustrates further example views 500 (A-B) of the workspace 114 provided by the display device 108. In view A, the workspace 114 includes a prior object 502 and a further object 504. In this example, the processor is configured to determine that the further object and the prior object are within predetermined tolerances of having the same size and shape and being mirror images of each other.

As illustrated in view B, responsive to this determination, the processor may be configured to replace the further object 504 with a replacement object 506 having a size and shape corresponding to the prior object and being a mirror image of the prior object.

Figure 6:
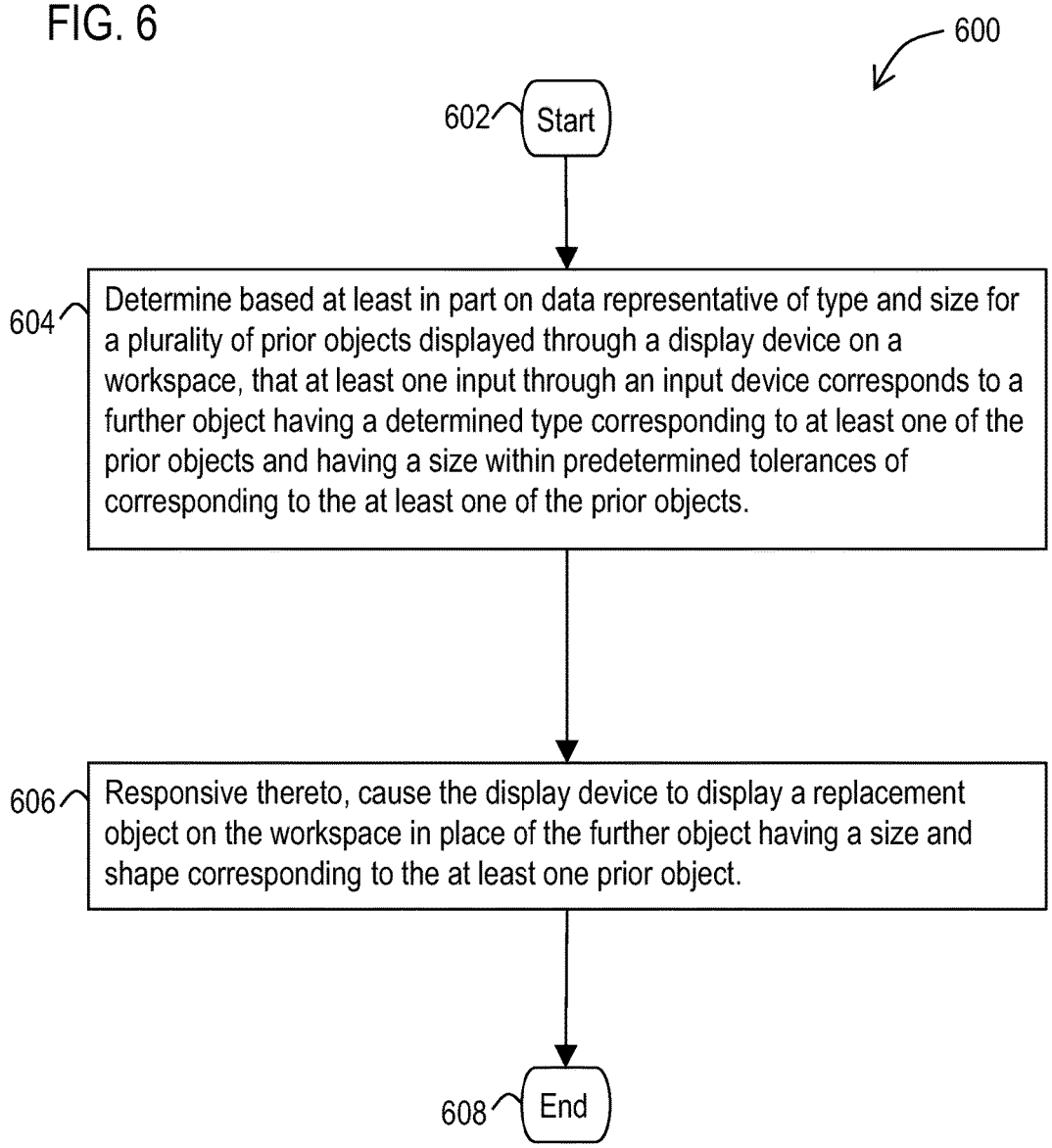
FIG. 6 illustrates a flow diagram of example methodologies that facilitate drawing objects.

With reference now to FIG. 6, various example methodologies are illustrated and described. While the methodologies are described as being a series of acts that are performed in a sequence, it is to be understood that the methodologies may not be limited by the order of the sequence. For instance, some acts may occur in a different order than what is described herein. In addition, an act may occur concurrently with another act. Furthermore, in some instances, not all acts may be required to implement a methodology described herein.

It is important to note that while the disclosure includes a description in the context of a fully functional system and/or a series of acts, those skilled in the art will appreciate that at least portions of the mechanism of the present disclosure and/or described acts are capable of being distributed in the form of computer-executable instructions contained within non-transitory machine-usable, computer-usable, or computer-readable medium in any of a variety of forms, and that the present disclosure applies equally regardless of the particular type of instruction or signal bearing medium or storage medium utilized to actually carry out the distribution. Examples of non-transitory machine usable/readable or computer usable/readable mediums include: ROMs, EPROMs, magnetic tape, floppy disks, hard disk drives, SSDs, flash memory, CDs, DVDs, and Blu-ray disks. The computer-executable instructions may include a routine, a sub-routine, programs, applications, modules, libraries, a thread of execution, and/or the like. Still further, results of acts of the methodologies may be stored in a computer-readable medium, displayed on a display device, and/or the like.

Referring now to FIG. 6, a methodology 600 that facilitates drawing objects is illustrated. The method may start at 602 and at 604 the methodology may include the act of (a) through operation of at least one processor, determining based at least in part on data representative of type and size for a plurality of prior objects displayed through a display device on a workspace, that at least one input through an input device corresponds to a further object having a determined type corresponding to at least one of the prior objects and having a size within predetermined tolerances of corresponding to the at least one of the prior objects.

In addition, the methodology 600 may include the act 606 of (b) through operation of the at least one processor responsive to act (a), causing the display device to display a replacement object on the workspace in place of the further object having a size and shape corresponding to the at least one prior object. At 608 the methodology may end.

In addition, the methodology 600 may include other acts and features discussed previously with respect to the system 100. For example, as discussed previously the methodology may include determining the type of the further object and selecting a candidate set of prior objects that have the same type as the further object from a larger set of prior objects that includes prior objects of different types. In addition the methodology may include comparing the size and shape of the further object to the respective sizes and shapes of the prior objects in the candidate set to determine the at least one prior object.

Also the data representative of the plurality of prior objects may be stored in at least one of a memory, a storage device, or a combination thereof and such data may respectively specify: a type, a size, a shape, and a position of the plurality of prior objects and the respective sequential order in which each was provided in the workspace. The methodology may include modifying the stored data to include a respective type, size, shape, and position of the replacement object and to indicate that the replacement object is the most recent of the prior objects.

In example embodiments, the methodology may also include selecting an amount of prior objects to include in the candidate set that is less than a total number of prior objects having the same type as the further object based at least in part on a predetermined maximum number of prior objects. Such an act may also correspond to selecting an amount of prior objects to include in the candidate set that is less than a total number of prior objects having the same type as the further object based at least in part on the sequential order in which of the prior objects were drawn.

In further example embodiments, the methodology may include selecting an amount of prior objects to include in the candidate set that is less than a total number of prior objects having the same type as the further object based at least in part on the position of the further object relative to the positions of the prior objects.

Also the methodology may include determining that the further object and at least two of the prior objects in the candidate set are within predetermined tolerances of having the same size and shape and of being equally spaced apart and aligned. Responsive to this determination the methodology may include causing the replacement object to be displayed through the display device such that the replacement object and the at least two of the prior objects have the same size and shape and are equally spaced apart and aligned.

In a further example, the methodology may include determining that the further object and at least four of the prior objects in the candidate set are within predetermined tolerances of having the same size and shape and of being aligned and/or spaced in a repeating pattern of differently aligned and/or differently spaced drawn objects. Responsive to this determination, the methodology may include causing the replacement object to be displayed through the display device such that the replacement object and the at least four of the prior objects have the same size and shape and have an alignment and/or spacing with respect to each other that enables the repeating pattern to continue with the addition of the replacement object.

In another example, the methodology may include determining that the further object and the at least one prior object is within predetermined tolerances of having the same size and shape and being mirror images of each other. Responsive thereto, the methodology may include causing the display device to display the replacement object in place of the further object having a size and shape corresponding to the at least one prior object and being a mirror image of the at least one prior object.

As discussed previously, such acts associated with these methodologies may be carried out by one or more processors. Such processor(s) may be included in one or more data processing systems for example that execute software components operative to cause these acts to be carried out by the one or more processors. In an example embodiment, such software components may be written in software environments/languages/frameworks such as Java, JavaScript, Python, C, C#, C++ or any other software tool capable of producing components and graphical user interfaces configured to carry out the acts and features described herein.

FIG. 7 illustrates a block diagram of a data processing system 700 (also referred to as a computer system) in which an embodiment can be implemented, for example as a portion of a PLM, CAD, and/or drawing system operatively configured by software or otherwise to perform the processes as described herein. The data processing system depicted includes at least one processor 702 (e.g., a CPU) that may be connected to one or more bridges/controllers/buses 704 (e.g., a north bridge, a south bridge). One of the buses 704 for example may include one or more I/O buses such as a PCI Express bus. Also connected to various buses in the depicted example may include a main memory 706 (RAM) and a graphics controller 708. The graphics controller 708 may be connected to one or more display devices 710. It should also be noted that in some embodiments one or more controllers (e.g., graphics, south bridge) may be integrated with the CPU (on the same chip or die). Examples of CPU architectures include IA-32, x86-64, and ARM processor architectures.

Other peripherals connected to one or more buses may include communication controllers 712 (Ethernet controllers, WiFi controllers, cellular controllers) operative to connect to a local area network (LAN), Wide Area Network (WAN), a cellular network, and/or other wired or wireless networks 714 or communication equipment.

Further components connected to various busses may include one or more I/O controllers 716 such as USB controllers, Bluetooth controllers, and/or dedicated audio controllers (connected to speakers and/or microphones). It should also be appreciated that various peripherals may be connected to the USB controller (via various USB ports) including input devices 718 (e.g., keyboard, mouse, touch screen, trackball, camera, microphone, scanners), output devices 720 (e.g., printers, speakers) or any other type of device that is operative to provide inputs or receive outputs from the data processing system. Further it should be appreciated that many devices referred to as input devices or output devices may both provide inputs and receive outputs of communications with the data processing system. Further it should be appreciated that other peripheral hardware 722 connected to the I/O controllers 716 may include any type of device, machine, or component that is configured to communicate with a data processing system.

Additional components connected to various busses may include one or more storage controllers 724 (e.g., SATA). A storage controller may be connected to a storage device 726 such as one or more storage drives and/or any associated removable media, which can be any suitable non-transitory machine usable or machine readable storage medium. Examples, include nonvolatile devices, volatile devices, read only devices, writable devices, ROMs, EPROMs, magnetic tape storage, floppy disk drives, hard disk drives, solid-state drives (SSDs), flash memory, optical disk drives (CDs, DVDs, Blu-ray), and other known optical, electrical, or magnetic storage devices drives and/or computer media. Also in some examples, a storage device such as an SSD may be connected directly to an I/O bus 704 such as a PCI Express bus.

A data processing system in accordance with an embodiment of the present disclosure may include an operating system 728, software/firmware 730, and data stores 732 (that may be stored on a storage device 726). Such an operation system may employ a command line interface (CLI) shell and/or a graphical user interface (GUI) shell. The GUI shell permits multiple display windows to be presented in the graphical user interface simultaneously, with each display window providing an interface to a different application or to a different instance of the same application. A cursor or pointer in the graphical user interface may be manipulated by a user through a pointing device such as a mouse or touch screen. The position of the cursor/pointer may be changed and/or an event, such as clicking a mouse button or touching a touch screen, may be generated to actuate a desired response. Examples of operating systems that may be used in a data processing system may include Microsoft Windows, Linux, UNIX, iOS, and Android operating systems.

The communication controllers 712 may be connected to the network 714 (not a part of data processing system 700), which can be any public or private data processing system network or combination of networks, as known to those of skill in the art, including the Internet. Data processing system 700 can communicate over the network 714 with one or more other data processing systems such as a server 734 (also not part of the data processing system 700). However, an alternative data processing system may correspond to a plurality of data processing systems implemented as part of a distributed system in which processors associated with several data processing systems may be in communication by way of one or more network connections and may collectively perform tasks described as being performed by a single data processing system. Thus, it is to be understood that when referring to a data processing system, such a system may be implemented across several data processing systems organized in a distributed system in communication with each other via a network.

Further, the term "controller" means any device, system or part thereof that controls at least one operation, whether such a device is implemented in hardware, firmware, software or some combination of at least two of the same. It should be noted that the functionality associated with any particular controller may be centralized or distributed, whether locally or remotely.

In addition, it should be appreciated that data processing systems may be implemented as virtual machines in a virtual machine architecture or cloud environment. For example, the processor 702 and associated components may correspond to a virtual machine executing in a virtual machine environment of one or more servers. Examples of virtual machine architectures include VMware ESCi, Microsoft Hyper-V, Xen, and KVM.

Those of ordinary skill in the art will appreciate that the hardware depicted for the data processing system may vary for particular implementations. For example the data processing system 700 in this example may correspond to a computer, workstation, and/or a server. However, it should be appreciated that alternative embodiments of a data processing system may be configured with corresponding or alternative components such as in the form of a mobile phone, tablet, controller board or any other system that is operative to process data and carry out functionality and features described herein associated with the operation of a data processing system, computer, processor, and/or a controller discussed herein. The depicted example is provided for the purpose of explanation only and is not meant to imply architectural limitations with respect to the present disclosure.

As used herein, the terms "component" and "system" are intended to encompass hardware, software, or a combination of hardware and software. Thus, for example, a system or component may be a process, a process executing on a processor, or a processor. Additionally, a component or system may be localized on a single device or distributed across several devices.

Also, as used herein a processor corresponds to any electronic device that is configured via hardware circuits, software, and/or firmware to process data. For example, processors described herein may correspond to one or more (or a combination) of a microprocessor, CPU, FPGA, ASIC, or any other integrated circuit (IC) or other type of circuit that is capable of processing data in a data processing system, which may have the form of a controller board, computer, server, mobile phone, and/or any other type of electronic device.

Those skilled in the art will recognize that, for simplicity and clarity, the full structure and operation of all data processing systems suitable for use with the present disclosure is not being depicted or described herein. Instead, only so much of a data processing system as is unique to the present disclosure or necessary for an understanding of the present disclosure is depicted and described. The remainder of the construction and operation of data processing system 700 may conform to any of the various current implementations and practices known in the art.

Although an exemplary embodiment of the present disclosure has been described in detail, those skilled in the art will understand that various changes, substitutions, variations, and improvements disclosed herein may be made without departing from the spirit and scope of the disclosure in its broadest form.

None of the description in the present application should be read as implying that any particular element, step, act, or function is an essential element which must be included in the claim scope: the scope of patented subject matter is defined only by the allowed claims. Moreover, none of these claims are intended to invoke 35 USC §112(f) unless the exact words "means for" are followed by a participle.

What is claimed is:

1. A system comprising:
   at least one processor configured to:
      determine based at least in part on data representative of type and size for a plurality of prior objects displayed through a display on a workspace and data that specifies a sequential order in which the prior objects were provided on the workspace, that at least one input through an input device corresponds to a further object having a determined type corresponding to at least one of the prior objects and having a size within predetermined tolerances of corresponding to the at least one of the prior objects; and
      cause responsive thereto the display device to display a replacement object on the workspace in place of the further object having a size and shape corresponding to the at least one prior object.

2. The system according to claim 1, wherein the type of the further and prior objects corresponds to a geometric primitive type or a geometric shape type.

3. The system according to claim 1, wherein the at least one processor is configured to determine the type of the further object and to select a candidate set of prior objects that have the same type as the further object from a larger set of prior objects that includes prior objects of different types, wherein the at least one processor is configured to compare the size and shape of the further object to the respective sizes and shapes of the prior objects in the candidate set to determine the at least one prior object.

4. The system according to claim 3, wherein the data representative of the plurality of prior objects is stored in at least one of a memory, a storage device, or a combination thereof and specifies: a type, a size, a shape, and a position of the plurality of prior objects and the sequential order in which each was provided on the workspace, wherein the at least one processor is configured to modify the stored data to include a type, size, shape, and position of the replacement object and to indicate that the replacement object is the most recent of the prior objects.

5. The system according to claim 4, wherein the at least one processor is configured to select an amount of prior objects to include in the candidate set that is less than a total number of prior objects having the same type as the further object based at least in part on a predetermined maximum number of previous objects.

6. The system according to claim 5, wherein the at least one processor is configured to select an amount of prior objects to include in the candidate set that is less than a total number of prior objects having the same type as the further object based at least in part on the sequential order.

7. The system according to claim 4, wherein the at least one processor is configured to select an amount of prior objects to include in the candidate set that is less than a total number of prior objects having the same type as the further object based at least in part on the position of the further object relative to the positions of the prior objects.

8. The system according to claim 4, wherein the at least one processor is configured to determine that the further object and at least two of the prior objects in the candidate set are within predetermined tolerances of having the same size and shape and of being equally spaced apart and aligned, and responsive thereto cause the replacement object to be displayed through the display device such that the replacement object and the at least two of the prior objects have the same size and shape and are equally spaced apart and aligned.

9. The system according to claim 1, where the at least one processor is configured to determine that the further object and the at least one of the prior object are within predetermined tolerances of having the same size and shape and being mirror images of each other, and responsive thereto cause the display device to display the replacement object in place of the further object having a size and shape corresponding to the at least one prior object and being a mirror image of the at least one prior object.

10. The system according to claim 4, further comprising a memory, an application software component, and a touch screen comprised of the input device and the display device, wherein the application software component is comprised of instructions that when included in the memory and executed by the at least one processor, cause the at least one processor to display the further object, the replacement object and the plurality of prior objects on the touch screen responsive to inputs received through a user touching the touch screen, wherein the application software component corresponds to a CAD software application that is operative to produce a CAD drawing based at least in part on the inputs through the touch screen.

11. A method comprising:
   a) through operation of at least one processor, determining based at least in part on data representative of type and size for a plurality of prior objects displayed through a display device on a workspace and data that specifies a sequential order in which the prior objects were provided on the workspace, that at least one input through an input device corresponds to a further object having a determined type corresponding to at least one of the prior objects and having a size within predetermined tolerances of corresponding to the at least one of the prior objects; and
   b) through operation of the at least one processor responsive to (a), causing the display device to display a replacement object on the workspace in place of the further object having a size and shape corresponding to the at least one prior object.

12. The method according to claim 11, wherein the type of the further and prior objects corresponds to a geometric primitive type or a geometric shape type.

13. The method according to claim 11, wherein (a) includes:
   c) through operation of the at least one processor, determining the type of the further object,
   d) through operation of the at least one processor, selecting a candidate set of prior objects that have the same type as the further object from a larger set of prior objects that includes prior objects of different types,
   e) through operation of the at least one processor, comparing the size and shape of the further object to the respective sizes and shapes of the prior objects in the candidate set to determine the at least one prior object.

14. The method according to claim 13, wherein the data representative of the plurality of prior objects is stored in at least one of a memory, a storage device, or a combination thereof and specifies: a type, a size, a shape, and a position of the plurality of prior objects and the sequential order in which each was provided on the workspace, further comprising:
   f) through operation of the at least one processor, modifying the stored data to include a type, size, shape, and position of the replacement object and to indicate that the replacement object is the most recent of the prior objects.

15. The method according to claim 14, wherein (d) includes through operation of the at least one processor selecting an amount of prior objects to include in the candidate set that is less than a total number of prior objects having the same type as the further object based at least in part on a predetermined maximum number of previous objects.

16. The method according to claim 15, wherein (d) includes through operation of the at least one processor selecting an amount of prior objects to include in the candidate set that is less than a total number of prior objects having the same type as the further object based at least in part on the sequential order.

17. The method according to claim 14, wherein (d) includes through operation of the at least one processor selecting an amount of prior objects to include in the candidate set that is less than a total number of prior objects having the same type as the further object based at least in part on the position of the further object relative to the positions of the prior objects.

18. The method according to claim 14, wherein (a) includes:
   g) through operation of the at least one processor, determining that the further object and at least two of the prior objects in the candidate set are within predetermined tolerances of having the same size and shape and of being equally spaced apart and aligned,
wherein (b) includes:
   h) responsive to (g), causing the replacement object to be displayed through the display device such that the replacement object and the at least two of the prior objects have the same size and shape and are equally spaced apart and aligned.

19. The method according to claim 11, wherein (a) includes:
   g) through operation of the at least one processor, determining that the further object and the at least one prior object is within predetermined tolerances of having the same size and shape and being mirror images of each other,
wherein (b) includes:
   h) responsive to (g), causing the display device to display the replacement object in place of the further object having a size and shape corresponding to the at least one prior object and being a mirror image of the at least one prior object.

20. A non-transitory computer readable medium encoded with executable instructions that when executed by at least one processor, cause the at least one processor to carry out a method comprising:
   a) determining based at least in part on data representative of type and size for a plurality of prior objects displayed through a display device on a workspace and data that specifies a sequential order in which the prior objects were provided on the workspace, that at least one input through an input device corresponds to a further object having a determined type corresponding to at least one of the prior objects and having a size within predetermined tolerances of corresponding to the at least one of the prior objects; and
   b) responsive to (a), causing the display device to display a replacement object on the workspace in place of the further object having a size and shape corresponding to the at least one prior object.

* * * * *